United States Patent
Soundararajan et al.

(10) Patent No.: US 9,049,257 B2
(45) Date of Patent: Jun. 2, 2015

(54) METHODS AND APPARATUS FOR AN E-MAIL-BASED MANAGEMENT INTERFACE FOR VIRTUALIZED ENVIRONMENTS

(75) Inventors: Vijayaraghavan Soundararajan, Palo Alto, CA (US); Conrad Herbert Albrecht-Buehler, Mountain View, CA (US); Balaji Parimi, Sunnyvale, CA (US); Raja Rao Dv, San Mateo, CA (US)

(73) Assignee: VMware, Inc., Palo Alto, CA (US)

( * ) Notice: Subject to any disclaimer, the term of this patent is extended or adjusted under 35 U.S.C. 154(b) by 133 days.

(21) Appl. No.: 13/330,088

(22) Filed: Dec. 19, 2011

(65) Prior Publication Data

US 2013/0159428 A1    Jun. 20, 2013

(51) Int. Cl.
| | |
|---|---|
| *G06F 15/16* | (2006.01) |
| *H04L 29/14* | (2006.01) |
| *H04L 12/58* | (2006.01) |
| *H04L 12/24* | (2006.01) |
| *G06F 9/48* | (2006.01) |
| *G06F 9/50* | (2006.01) |
| *G06F 11/07* | (2006.01) |
| *G06Q 10/10* | (2012.01) |
| *G06F 9/455* | (2006.01) |

(52) U.S. Cl.
CPC .............. *H04L 69/40* (2013.01); *H04L 12/58* (2013.01); *H04L 41/026* (2013.01); *G06F 9/4856* (2013.01); *G06F 9/5077* (2013.01); *G06F 11/0712* (2013.01); *G06F 2009/4557* (2013.01); *G06F 2009/45575* (2013.01); *G06F 9/45512* (2013.01); *G06F 9/45533* (2013.01); *G06Q 10/107* (2013.01)

(58) Field of Classification Search
CPC . G06F 9/4856; G06F 9/5077; G06F 11/0712; G06F 2009/4557; G06F 2009/45575; H04L 12/58; H04L 41/026; H04L 69/40
USPC .......... 709/203, 206, 217, 219, 220, 221, 222, 709/223; 718/1; 370/216
See application file for complete search history.

(56) References Cited

U.S. PATENT DOCUMENTS

| | | | |
|---|---|---|---|
| 5,745,692 A | 4/1998 | Lohmann, II et al. | |
| 6,567,937 B1 | 5/2003 | Flores et al. | |
| 6,697,942 B1 * | 2/2004 | L'Heureux et al. | 713/152 |
| 7,577,722 B1 * | 8/2009 | Khandekar et al. | 709/220 |
| 2001/0003827 A1 * | 6/2001 | Shimamura | 709/206 |
| 2001/0047213 A1 * | 11/2001 | Sepe, Jr. | 700/65 |
| 2002/0032741 A1 * | 3/2002 | Hilt | 709/206 |
| 2003/0060900 A1 * | 3/2003 | Lo et al. | 700/19 |
| 2004/0019643 A1 * | 1/2004 | Zirnstein, Jr. | 709/206 |
| 2006/0190532 A1 * | 8/2006 | Chadalavada | 709/203 |
| 2007/0027965 A1 * | 2/2007 | Brenes et al. | 709/206 |

(Continued)

*Primary Examiner* — Liangche A Wang
*Assistant Examiner* — Johnny Aguiar

(57) ABSTRACT

A server system is configured to provide an e-mail based interface for executing management operations on a virtualized infrastructure which includes a plurality of virtual machines (VMs), underlying host computers, clusters, and/or data centers. Such an interface may be provided in a virtualized infrastructure to enable a system administrator to execute administrative operations remotely from a mobile device without requiring custom installation of an application on the mobile device or a secure connection to the server system. The server system receives e-mails at a pre-determined e-mail address, authenticates the sender of the e-mail, and extracts and executes commands from the e-mail. A number of techniques for validating the e-mail containing server commands may also be provided.

12 Claims, 8 Drawing Sheets

(56) References Cited

U.S. PATENT DOCUMENTS

| | | | | |
|---|---|---|---|---|
| 2008/0162923 A1* | 7/2008 | Arnold | | 713/150 |
| 2008/0208899 A1* | 8/2008 | Motoyama et al. | | 707/103 X |
| 2009/0092131 A1* | 4/2009 | Hu et al. | | 370/356 |
| 2009/0327429 A1* | 12/2009 | Hughes et al. | | 709/206 |
| 2011/0252153 A1* | 10/2011 | Vlodavsky | | 709/229 |
| 2012/0167233 A1* | 6/2012 | Gillum | | 726/29 |
| 2012/0284715 A1* | 11/2012 | Fitzgerald et al. | | 718/1 |
| 2013/0086200 A1* | 4/2013 | Alanis et al. | | 709/214 |
| 2013/0238804 A1* | 9/2013 | Tanino et al. | | 709/226 |
| 2013/0247033 A1* | 9/2013 | Sawhney et al. | | 718/1 |

* cited by examiner

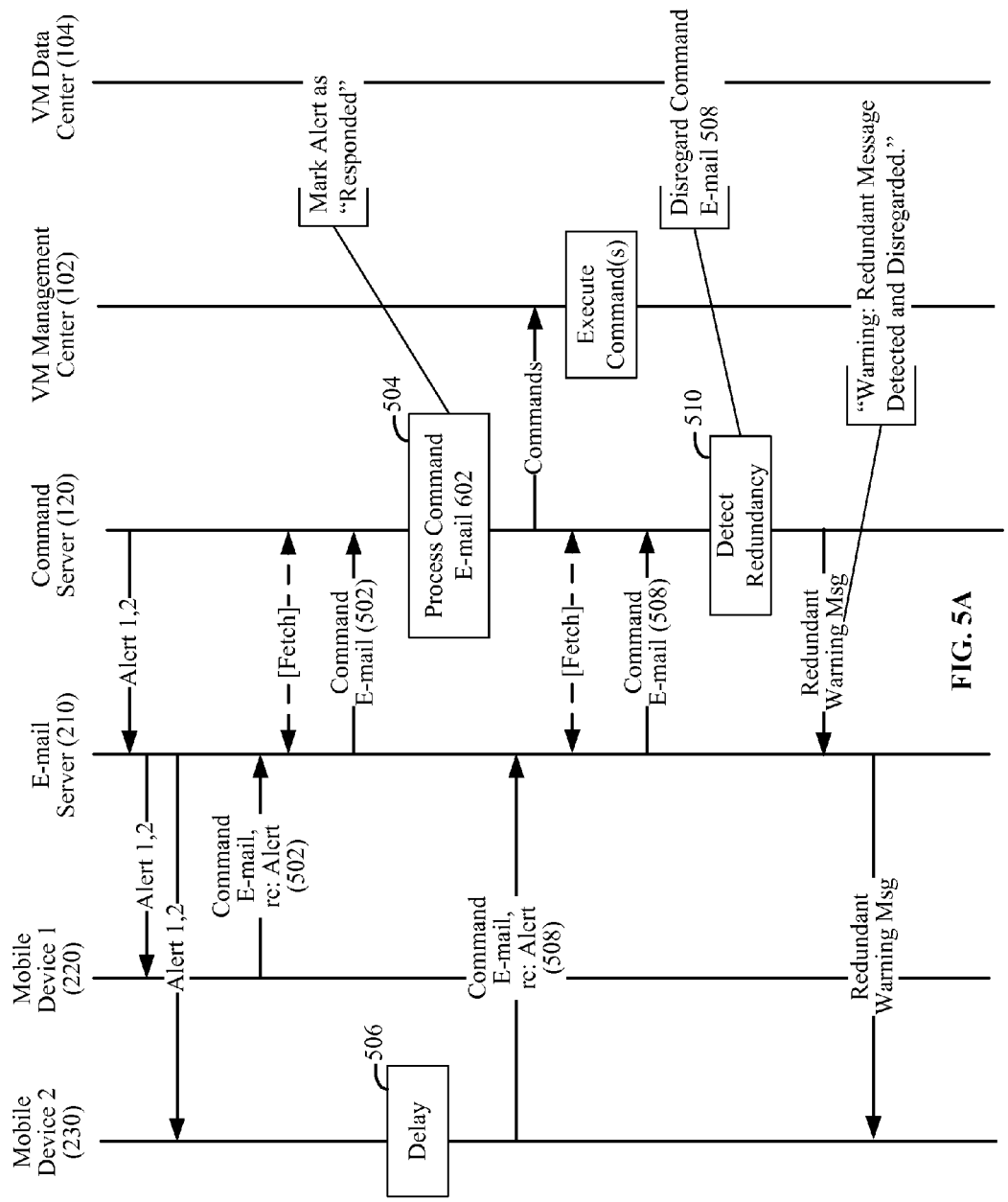

METHODS AND APPARATUS FOR AN E-MAIL-BASED MANAGEMENT INTERFACE FOR VIRTUALIZED ENVIRONMENTS

BACKGROUND

Software for managing a virtualized data center is responsible for monitoring physical hosts and virtual machines (VMs) running in the physical hosts and, further, for performing management operations such as provisioning and configuration tasks. One example of such management software is vSphere™ available from VMware, Inc. of Palo Alto, Calif. The set of hosts, VMs, data storage units, networks, and the organization of these elements into data centers, clusters, and resource pools, managed by such software, is commonly referred to as a virtualized computer inventory (hereinafter referred to as the "inventory").

In a conventional virtualized data center, one or more administrators are responsible for monitoring and managing the operation of the virtualized data center. The administrators carry out such tasks typically using a management terminal having a graphical user interface or a command-line interface to interact with the management software. In response, the management terminal issues appropriate management instructions to the management software over a network, such as a local area network (LAN), a wide area network (WAN), a Virtual Private Network (VPN), or other suitable communication networks.

The ability to manage the virtualized data center from a mobile device has become increasingly important, especially in scenarios where an administrator may be out of the office. Administrators may utilize a mobile device (e.g., a smartphone, personal digital assistant, tablet computer) running a management terminal software application to interact with the management software. However, as mobile devices proliferate and utilize a wide variety of hardware and software platforms, it becomes challenging to provide and support a management terminal software application that is compatible with all the different hardware and software platforms. As such, there is a need for a cross-platform method for remotely managing a virtualized infrastructure.

SUMMARY

One or more embodiments of the present invention provide a cross-platform mechanism for processing commands received from a remote device to enable an administrator to remotely manage a virtualized computing environment, for example, from a mobile device. The administrator composes an e-mail message with one or more commands and sends the e-mail message to a system configured to process the e-mail and execute the commands contained therein. The e-mail message may be composed using any e-mail client that is suitable for generating an e-mail message and is available for a wide range of hardware and software platforms. Various authentication and authorization techniques may be applied to the processing of the e-mail message to ensure security and integrity of the virtualized computing environment.

One or more embodiments of the present invention provide methods of processing commands for a virtual machine (VM) management module that manages a virtualized computing environment comprising a plurality of physical host computers executing one or more VMs. The method includes receiving an e-mail message comprising one or more commands for managing the virtualized computing environment in a first format and validating the e-mail message to determine whether to process the e-mail message. Responsive to determining that the e-mail message should be processed, the method proceeds to parse the e-mail message to extract the one or more commands and translating the one or more commands in the first format to a second format that is executable by the VM management center.

Additionally, embodiments of the invention provide a method of processing commands for a virtual machine (VM) management module that manages a virtualized computing environment comprising a plurality of physical host computers executing one or more VMs. The method includes receiving an e-mail message from a user that comprises one or more commands for managing the virtualized computing environment. The method further includes determining whether the e-mail message is a redundant response to an alert condition of the virtualized computing environment. Responsive to determining that the e-mail message is not a redundant response, the method proceeds to parsing the e-mail message to extract the one or more commands. The method then includes generating one or more instructions executable by the VM management center based on the one or more commands.

Embodiments of the present invention further include a non-transitory computer-readable storage medium storing instructions that when executed by a computer system cause the computer system to perform one of the methods set forth above.

BRIEF DESCRIPTION OF THE DRAWINGS

FIGS. 4A and 4C illustrate a method for e-mail based management of a virtualized environment according to another embodiment of the invention.

FIGS. 5A and 5B are sequence diagrams that illustrate methods for e-mail based management of a virtual environment utilizing a technique to handle response redundancy, according to one embodiment of the present invention.

DETAILED DESCRIPTION

Figure 1:
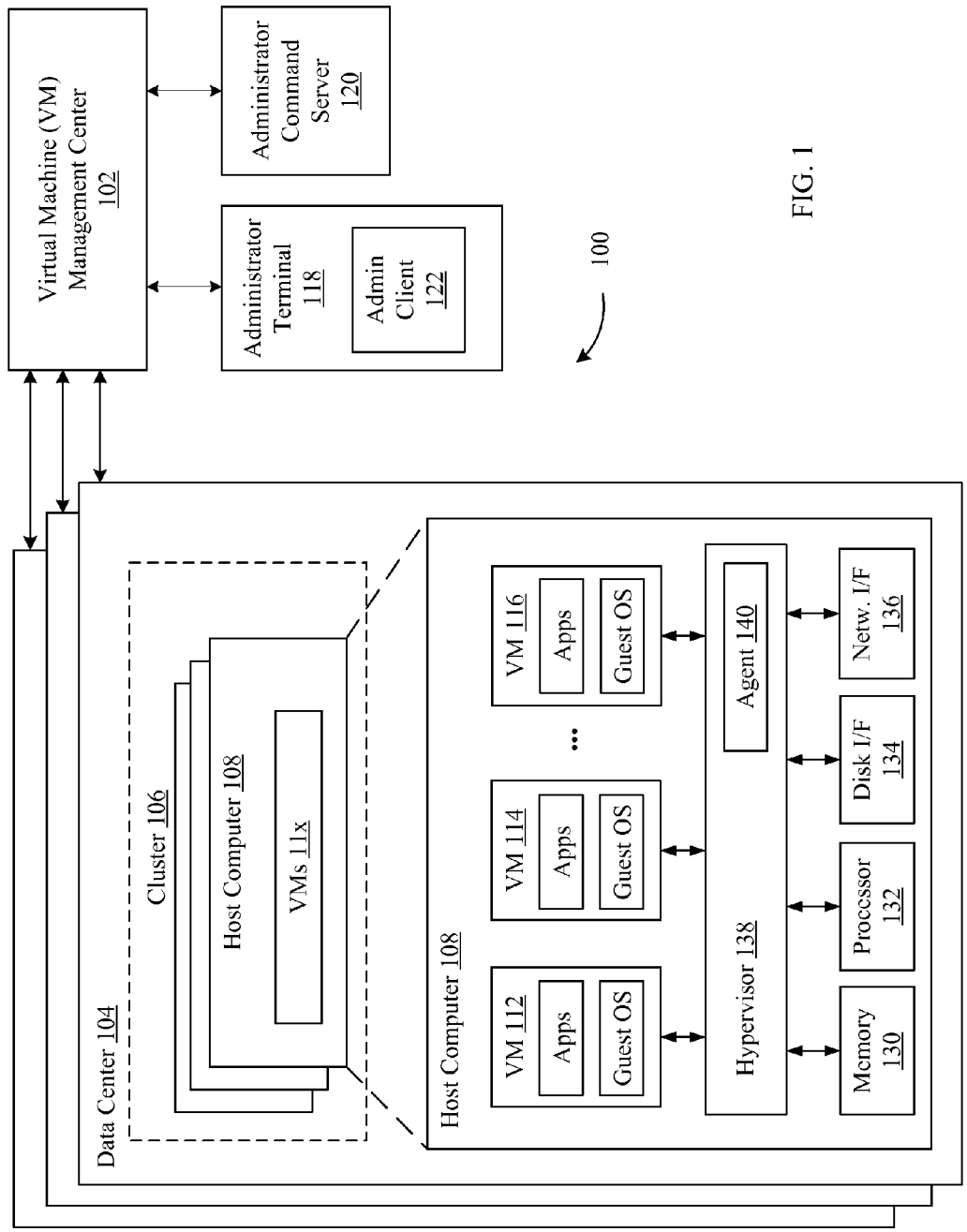
FIG. 1 is a block diagram that illustrates a virtualized computer system with which one or more embodiments of the present invention may be utilized.

FIG. 1 is a block diagram that illustrates a virtualized computer system 100 with which one or more embodiments of the present invention may be utilized. As illustrated, the virtualized computer system 100 includes one or more data centers, each data center having a plurality of host computers 108. For clarity, only a first data center 104 is shown. The host computers 108 may further be organized into one or more clusters 106. The host computers 108 (also referred to as "servers") are configured to support a virtualized environment and to deliver one or more application services related to information technology, including but not limited to, web services, database services, data processing services, and directory services.

Each host computer 108 may include conventional components of a computing device, such as memory 130, a processor 132, a disk interface 134, and a network interface 136. Examples of the disk interface 134 are a host bus adapter and a network file system interface. An example of the network interface 136 is a network adapter, also referred to as a Network Interface Card (NIC). In some embodiments, a plurality of NICs is included in the network interface 136. Each host computer 108 provides a virtualization layer that abstracts processor, memory, storage, and/or networking resources into multiple virtual machines (VMs) that run concurrently on the same host computer 108. As shown, one or more virtual machines are configured within the host computer 108, represented in FIG. 1 as VM 112, VM 114, and VM 116, which share the hardware resources of host computer 108.

The virtual machines run on top of a software interface layer 138 (referred to herein as a "hypervisor") that enables sharing of the hardware resources of the host computer 108 by the virtual machines. The hypervisor 138 may run on top of the operating system of the host computer 108 or directly on hardware components of the host computer 108. Each virtual machine includes a guest operating system and one or more guest applications running on top of the guest operating system. As also shown, an agent 140 is provided in the hypervisor 138, by which specific information pertaining to the virtualization settings and configurations of the host computer 108, and any VMs included therein, is transmitted to a VM management center 102, discussed below, according to a schedule or in response to queries by the VM management center 102.

The VM management center 102 is a computer program that resides and executes in a central server, which may reside in one of data centers 104, or alternatively, running as a VM in one of the host computers 108. The VM management center 102 is in communication with each of the data centers 104, clusters 106, and host computers 108, and carries out administrative tasks for the virtualized computer system 100 including, but not limited to, managing the data centers 104, managing the virtual machines running within each host computer 108, provisioning the virtual machines, migration of virtual machines from one host computer to another, allocating physical resources, such as processor and memory, load balancing between host computers 108 and clusters 106, and so on. In one embodiment, the VM management center 102 interacts with an agent included in the host computers 108, such as the agent 140, to exchange information using application programming interface (API) calls.

The VM management center 102 may perform administrative tasks for the virtualized computer system 100 autonomously, or may perform administrative tasks in response to one or more commands issued by a system administrator. A system administrator may access the VM management center 102 via an administrator terminal 118 that is connected to the management center via a local area network (LAN) connection or a wide area network (WAN) connection. The connection may be secured using a Virtual Private Network (VPN) or other suitable means. The administrator terminal 118 may be any computing device that includes conventional components, such as a processor, memory, storage, and network interface. To support a direct interface with the VM management center 102, the administrator terminal 118 may include a software application (depicted as an administrative client 122 in FIG. 1), that produces a graphical user interface or a command-line interface. As discussed above, as new computing devices, particularly mobile devices, proliferate and utilize a variety of hardware and software platforms, it may be challenging to implement and maintain an administrative client that is compatible with the variety of hardware and software platforms in the marketplace.

Accordingly, in one or more embodiments of the invention, a system administrator "accesses" the VM management center 102 by sending e-mail messages to an administrator command server 120 configured to provide an e-mail-based interface to the VM management center 102, thereby enabling the system administrator to remotely manage the virtualized computing system 100 using a mobile device. In one embodiment, the administrator command server 120 is configured to communicate with the VM management center 102 to transmit messages (e.g., management instructions) to and receive messages (e.g., status messages) from the VM management center 102. The administrator command server 120 may be communicatively coupled to the VM management center 102 via an inter-process communication (IPC) system, including, but not limited to, network sockets, shared memory, remote procedure calls (RPC), and/or a web services API (Application Program Interface). Details of the administrator command server 120 are discussed and shown in greater detail in FIG. 2. While the administrator command server 120 is depicted in FIGS. 1 and 2 as a separate component that resides and executes on a separate central server, it should be recognized that the administrator command server 120 may alternatively reside in any one of the computing devices of the virtualized computing system 100, such as the same central server where the VM management center 102 resides.

Figure 2:
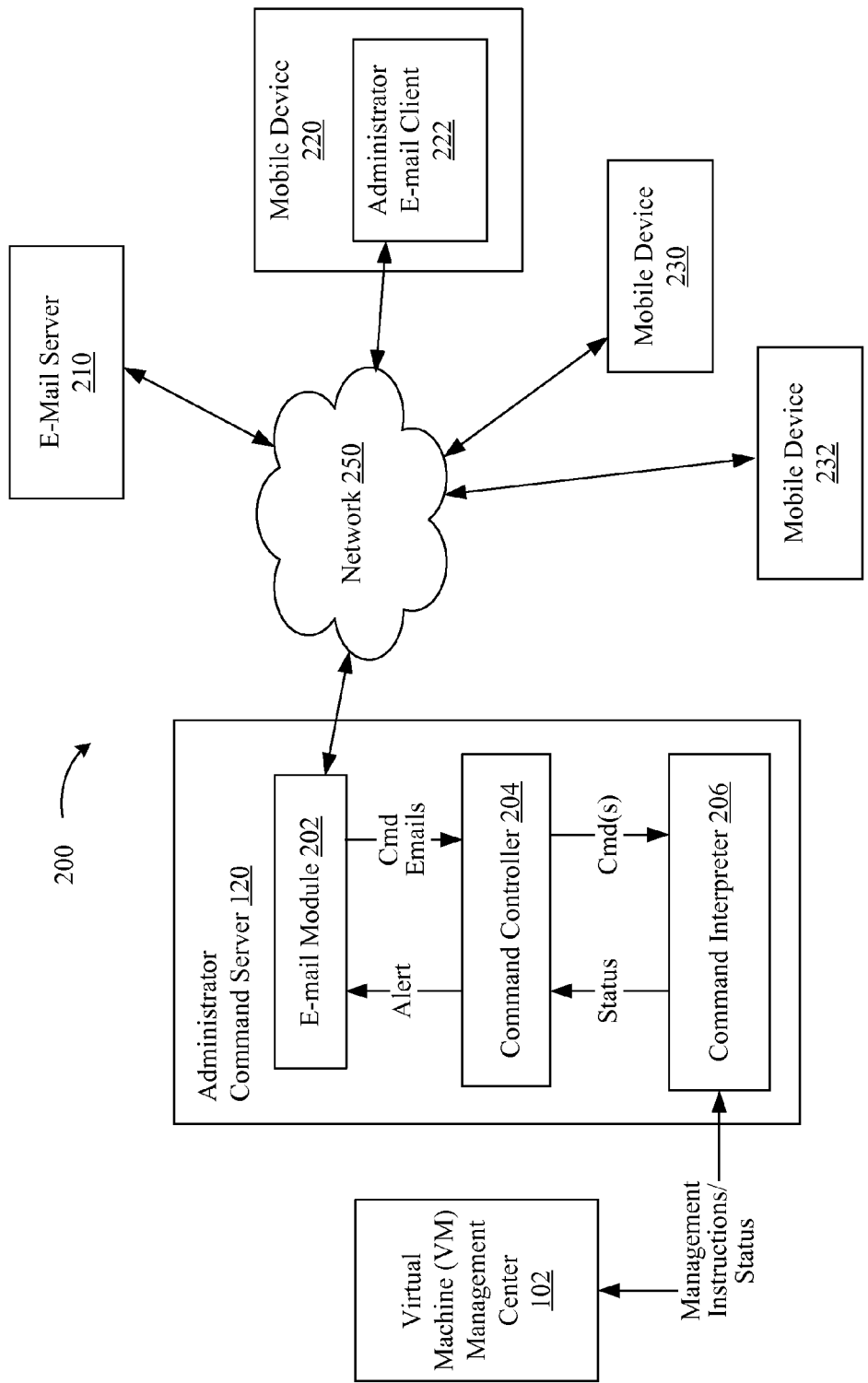
FIG. 2 is a block diagram that illustrates a system for implementing a method for e-mail-based management of the virtualized computer system of FIG. 1, according to one embodiment of the present invention.

FIG. 2 is a block diagram that illustrates a system 200 for implementing a method for e-mail-based management of the virtualized computer system 100 of FIG. 1, utilizing the administrator command server 120, according to one embodiment of the present invention. As shown, the system 200 includes the administrator command server 120 communicatively coupled to the VM management center 102 of FIG. 1, an e-mail server 210, and a plurality of mobile devices 220, 230, 232, each connected to a communications network 250. The mobile device 220 is configured to be operable by a system administrator or other suitable user to communicate with the VM management center 102 according to embodiments of the invention described herein. The mobile device 220 may be a smartphone, a tablet computing device, a personal digital assistant (PDA), and in general other suitable computing devices that are portable and configured for wireless connectivity with a network, such as the network 250. The mobile device 220 is described in detail herein, while discussion of the mobile devices 230, 232 is omitted for sake of brevity. It should be understood that the other mobile devices 230, 232 may have similar elements and be configured similarly as the mobile device 220, according to embodiments of the present invention. Further, for clarity of discussion, it is understood that a user, such as a system administrator, may be operating the mobile device 220 and that the user and the mobile device 220 may connect be referred to interchangeably.

According to one embodiment, the mobile device 220 includes an administrator e-mail client 222 configured to communicate with the e-mail server 210 to transmit and receive e-mail messages. The administrator e-mail client 222 is configured to transmit e-mail messages (herein referred to as "command e-mails") addressed to an e-mail account corresponding to the administrator command server 120 (herein referred to as a "command server e-mail address"). The command e-mails may include one or more commands for the VM management center 102 to perform system administrative procedures and management tasks on the virtualized computing system 100.

In some embodiments, the administrator e-mail client 222 may be a software application configured to generate, transmit, receive, and display e-mail messages via any of the e-mail techniques and protocols known in the art, including Simple Mail Transfer Protocol (SMTP), Post Office Protocol (POP), and Internet Message Access Protocol (IMAP). Alternatively, the administrator e-mail client 222 may be a software application configured to provide access to such means (e.g., a web browser providing access to a web-based e-mail service.) In one embodiment, the administrator e-mail client 222 is configured to support "push e-mail" to reduce latency of communication between the administrator command server 120 and the mobile device 220.

In one embodiment, the administrator e-mail client 222 is configured to generate a command e-mail having a plurality of header fields, collectively referred as the e-mail header, and an e-mail body. The administrator e-mail client 222 may generate a command e-mail having an e-mail body containing one or more commands formatted according to a command-line syntax specified for the administrator command server 120. Further, the administrator e-mail client 222 may be configured to generate the command e-mail to include additional metadata, such as tags or identifiers, contained in the e-mail header and/or in the e-mail body for facilitating processing techniques described herein.

The administrator command server 120 is generally configured to receive command e-mails via the e-mail server 210 and process the command e-mails to generate instructions executable by the VM management center 102. The administrator command server 120 includes an e-mail module 202 for performing e-mail related operations, a command controller 204 for processing the command e-mails to extract one or more commands, and a command interpreter 206 for generating instructions executable by the VM management center 102 based on the extracted commands.

In one embodiment, the e-mail module 202 of the administrator command server 120 is configured to communicate with the e-mail server 210 via the network 250 to retrieve e-mails addressed to a command server e-mail address associated with the administrator command server 120 (e.g., "commandgateway@zsphere.com"). The e-mail module 202 connects to the e-mail server 210 and fetches command e-mails addressed to the command server e-mail address using a username, password, domain information, and other account settings. The e-mail module 202 is configured to access the e-mail server 210 at a user-configurable periodicity to send and/or receive e-mail messages. For example, the e-mail module 202 may be configured to poll the e-mail server 210 for new command e-mails every 5 minutes. In one embodiment, similar to the administrator e-mail client 222, the e-mail module 202 is configured to support a "push e-mail" protocol such that command e-mails are actively transferred (i.e., pushed) from the e-mail server 210 to the e-mail module 202 as the e-mail messages arrive at the e-mail server 210.

In one embodiment, the e-mail module 202 is configured to generate e-mail messages containing output from the VM management center 102 and addressed to one or more recipients responsible for the VM management center 102, such as a system administrator. In one embodiment, the e-mail module 202 generates and transmits an e-mail message containing an alert message (sometimes referred to as an "alert") that notifies system administrators of a condition in the VM management center 102 (e.g., system outage). In another embodiment, the e-mail module 202 generates an e-mail message containing output from the VM management center 102 (herein referred to as "status message") in response to a specific command received from the system administrators. For example, a status message indicating an uptime condition of the VM management center 102 may be sent by the e-mail module 202 in response to receiving a command requesting "status." In another example, a status message may be generated that contains a verbose output indicating a successful or unsuccessful execution of a command e-mail.

In one embodiment, the e-mail module 202 is further configured to provide "read receipt" functionality for the command server 120. According to such a configuration, the e-mail module 202 transmits an acknowledgment message for each command e-mail received by the administrator command server 120 to signal successful receipt to the sender of the command e-mail. Embodiments of the invention that utilize the read receipt functionality reduce issues of uncertain delivery that may arise in an e-mail based management interface. Alternatively, the e-mail module 202 may be configured to transmit a "read receipt" when the administrator command server 120 opens and reads, rather than merely receive, the command e-mail.

In one particular implementation, the e-mail module 202 utilizes one or more software libraries to programmatically connect to the e-mail server 210 and perform one or more e-mail related functions. For example, the e-mail module 202 may utilize Java APIs for fetching e-mail from the e-mail server 210, extracting e-mail metadata and data, generating new e-mail messages, and sending e-mail messages to recipients, such as the mobile device 220, via the e-mail server 210. Embodiments of the invention may be extended to utilize other suitable software libraries, frameworks, and APIs for implementing the techniques described herein.

In at least some embodiments, the network 250 interconnecting the administrator e-mail client 222, the e-mail server 210, and the e-mail module 202 includes one or more networking technologies, such as a local area network (LAN), wide area network (WAN), wireless network, telephony, the Internet, and/or a combination thereof. It should therefore be recognized that the network 250 may be insecure such that communications via the network 250 may be spoofed or altered by third parties. It should further be recognized that communications via the network 250 may be asynchronous such that command e-mails by multiple parties, such as mobile devices 220, 230, 232, transmitted at the same time may arrive at the administrator command server 120 at varying times. Accordingly, techniques are herein provided for processing the command e-mails to address the aforementioned issues.

In one embodiment, the command controller 204 of the administrator command server 120 is configured to validate one or more command e-mails retrieved by the e-mail module 202. It is noted that the operations for "validating" a command e-mail generally refers to performing one or more procedures for determining whether to proceed with processing of the command e-mail and execution of the commands contained therein. The command controller 204 may be configured to validate a command e-mail based on command e-mail authenticity, for example, by verifying the identity of the e-mail sender or by verifying the command e-mail has not been tampered with, as further discussed with FIG. 4. The command controller 204 may further be configured to validate a command e-mail based on sender authorization, for example, by determining an access control policy or permissions of an e-mail sender to execute commands on the VM management center 102, as further discussed with FIG. 4. Finally, the command controller 204 may be configured to validate a command e-mail to address issues of response redundancy that arise from asynchronous delivery of command e-mails, as further discussed with FIGS. 5A and 5B.

The command controller 204 is configured to invoke the command interpreter 206 to communicate with the VM management center 102 and execute commands extracted from the command e-mail. The command interpreter 206 is configured to transmit commands to the VM management center 102 and/or receive output resultant from the transmitted commands or otherwise unsolicited status output from the VM management center 102.

In one embodiment, the command interpreter 206 is a command-line interpreter (CLI) that enables allows a system administrator to express commands a simple language (i.e., syntax) and execute those commands on the VM management center 102, rather than requiring use of a graphical user interface. The CLI may be a software layer that translates one or more commands into instructions in a format that is understood and executable by the VM management center 102. Examples of command interpreters that are suitable for implementing embodiments of the invention include PowerCLI or vSphere SDK for Perl for VMware vSphere available from VMware, Inc. of Palo Alto, Calif., or one of a variety of other suitable command-line interpreter systems.

Figure 3:
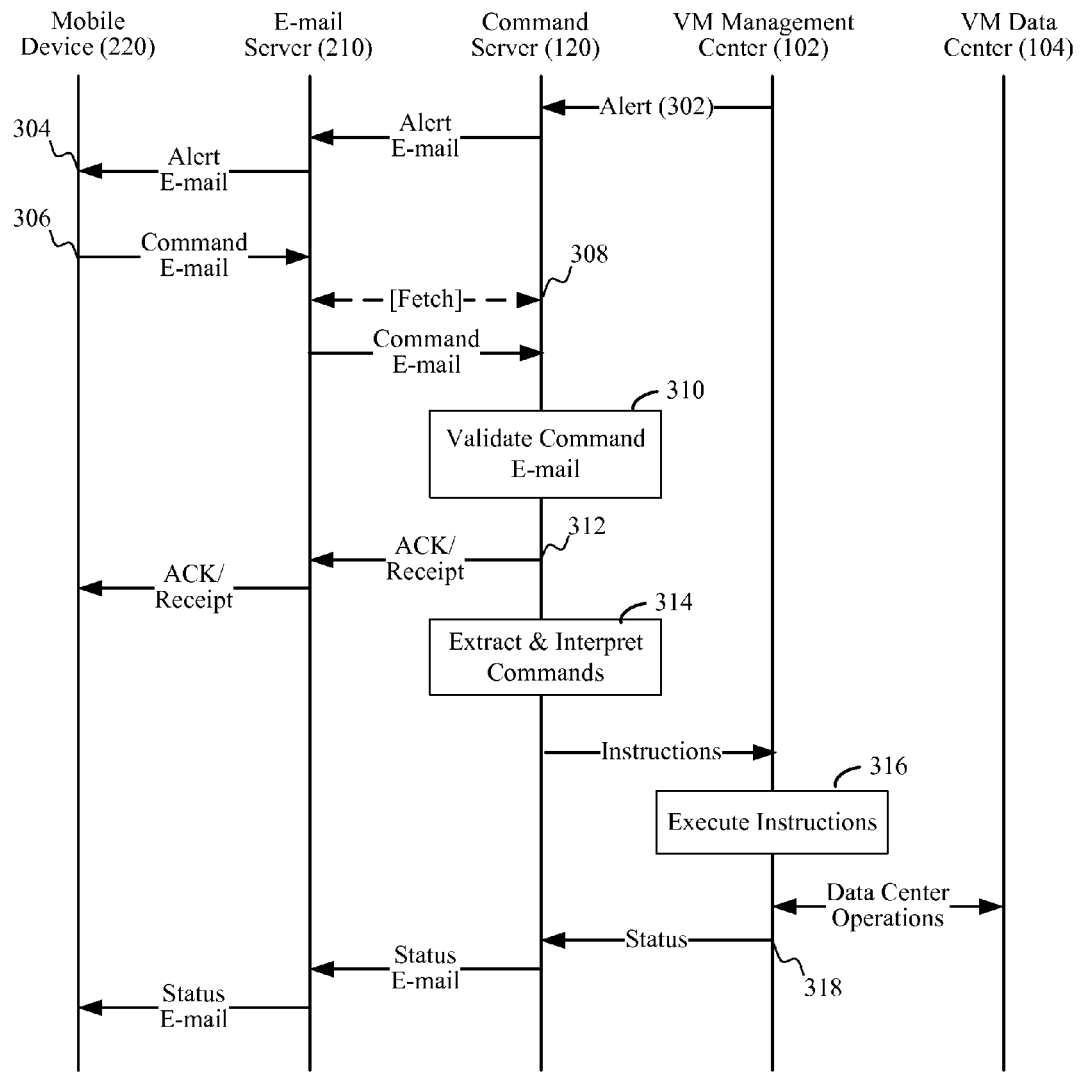
FIG. 3 is a sequence diagram that illustrates example operations for e-mail-based management of a virtual environment, according to one embodiment of the present invention.

The operations of system 200 are shown in FIG. 3. FIG. 3 is a sequence diagram that illustrates example operations for e-mail-based management of a virtual environment, according to one embodiment of the present invention. While the example operations are depicted as being performed by the system 200 of FIG. 2, it is contemplated that embodiments of the invention may be performed by other suitable systems.

At step 302, the command server 120 may receive a notification from the VM management center 102 that a potential issue, condition, and/or problem (referred herein as an "alert condition") has been detected for the VM data center 104. For example, the command server 120 may receive a notification that one or more VMs in the VM data center 104 is over-provisioned, experiencing overload, and/or unresponsive. The command server 120 notifies one or more system administrators of the alert condition through suitable expedient communication means, such as paging, text messaging, instant messaging, or, according to one embodiment of the present invention, e-mail.

In one embodiment, responsive to detecting an alert condition, the e-mail module 202 of the command server 120 generates an e-mail alert message for the one or more system administrators designated as contacts for such alert messages. The e-mail module 202 of the command server 120 connects to the e-mail server 210 and transmits the alert message. The alert e-mail includes an e-mail body containing a description of the alert condition. In one embodiment, the e-mail body includes a text description of the alert condition, a graphical depiction of the alert condition, and/or some combination thereof.

In one embodiment, the e-mail module 202 generates an alert e-mail having additional metadata information for facilitating processing techniques described herein. The e-mail module 202 may generate an alert e-mail having a unique reference identifier for the alert condition, referred herein as an "alert identifier." The alert identifier may be located in the e-mail body and/or in the subject line (e.g., "Subject: Alert #20110819.1547920A"). Alternatively, the alert identifier may be located within one or more custom metadata fields in the e-mail header (e.g., "X-AlertMessageID: 20110819.1547920A"). Additionally, the e-mail module 202 may be configured to specify a customized e-mail address in a "Reply-To:" field of the e-mail header, for example, such as "REPLY-ALERT1547920A@zsphere.com." The customized reply-to e-mail address may be generated, upon request, by the command server 120 and corresponds to the alert. The command server 120 may utilize the customized reply-to e-mail address to identify any e-mails received at that address as being responsive to the corresponding alert.

One example of an alert e-mail to a plurality of system administrators, having e-mail addresses such as "admin1@zsphere.com," "admin2@zsphere.com," "admin3@zsphere.com," may appear as follows:

---

From: commandgateway@zsphere.com
To: admin1@zsphere.com, admin2@zsphere.com, admin3@zsphere.com
Subject: Issue #20110819.1547920A

---

Host Computer ALPHA at 192.168.0.181 has CPU Load of 99% for a time period exceeding 12 hour(s).

---

NOTE: This alert [#20110819.1547920A] has been sent to you because you have been designated a system administrator for VM Center ALPHA.

---

At some time later, at step 304, the administrator e-mail client 222 of the mobile device 220 connects to the e-mail server 210 and retrieves any e-mail messages, including the alert message, addressed to the system administrator operating the mobile device 220. The administrator e-mail client 222 makes available the alert message for review by the system administrator. At some time later, the system administrator may read the alert message and decide to respond to the alert message with instructions for the VM management center 102 to perform one or more actions ameliorative to the alert condition.

At step 306, the system administrator composes a command e-mail from the mobile device 220 that is addressed to the command server e-mail address. The body of the command e-mail includes one or more commands formatted according to a command-line syntax accepted by the command server 120. In one embodiment, each command may be separated by a predetermined delimiter, for example, such as a carriage return or newline (i.e., each command on a separate line) or a blank line. The commands are arranged in a sequence corresponding to an order of execution. The command e-mail may retain the alert identifier provided by the alert message, for example, and store the alert identifier in the subject line or in the body of the e-mail (e.g., "Re: Alert #20110819.1547920A"), within one or more custom fields in the e-mail headers (e.g., "X-In-Reply-to-Alert: 20110819.1547920A"), and/or a combination thereof.

For example, the system administrator may seek to instruct the VM management center 102 to power off two virtual machines (VMs), named VM1 and VM2, in the VM data center 104. As such, the system administrator composes an e-mail message addressed to the command server e-mail address (e.g., "commandgateway@zsphere.com") and having the commands "Stop-VM—name 'VM1'", "Stop-VM—name 'VM2'" in the e-mail body. In the example shown below, the syntax used by the command syntax provided by PowerCLI, although other suitable command-line syntaxes are contemplated. An example of a command e-mail may appear as follows:

---

From: admin1@zsphere.com
To: commandgateway@zsphere.com
CC: monitor@zsphere.com, supervisor1@zsphere.com
Subject: Re: Issue #20110819.1547920A Stop-VM-name "VM1"
Stop-VM-name "VM2"

---

Additionally, the system administrator optionally includes conventional recipients of the e-mail message, using the To, CC, and BCC fields as it is known in the art. In one example, the command e-mail may be copied to a monitoring inbox (e.g., "monitor@zsphere.com") that corresponds to a repository for all command e-mails. In another example, the system administrator may include an e-mail address of a third party, such as a supervisor (e.g., "supervisor1@zsphere.com") in the CC: field of the e-mail.

At step 308 at some time later, for example, such as after a reconfigurable periodicity, the administrator command server 120 contacts the e-mail server 210 and fetches any e-mail messages addressed to the command server e-mail address, including the command e-mail sent at step 306.

At step 310, the command server 120 validates the command e-mail to determine whether to proceed with processing the received command e-mail. As mentioned above, the step of validating the command e-mail may include resolving a number of technical issues involved with an asynchronous method (i.e., e-mail-based method) for managing the virtualized computing environment, such as issues of authorization, response redundancy, and uncertain delivery.

At step 312, the command server 120 sends an acknowledgement message to notify the mobile device 220 that command e-mail has been successfully delivered and read (i.e., processed). In the embodiment shown, the acknowledgment message is an e-mail message sent to the mobile device 220 via the e-mail server 210. Alternatively, the command server 120 may transmit a "read receipt" signal to the e-mail server 210, whereby the e-mail server 210, upon receiving the "read receipt" signal from the command server 120, sends the acknowledgement message to the mobile device 220.

At step 314, the command server 120 extracts one or more commands from the body of the command e-mail. The command interpreter 206 of the command server 120 interprets the commands to generate one or more instructions in a formation executable by the VM management center 102. The command interpreter 206 connects to the VM management center 102 to relay the instructions to the VM management center 102 for execution. At step 316, the VM management center 102 executes the instructions to perform one or more data center operations on the VM data center 104.

At step 318, after the instructions have been executed, a status output message is returned from the VM management center 102 to the command server 120. The command server 120 generates one or more status e-mails that includes the contents of the status output messages and transmits the status e-mails to the system administrator via e-mail.

Figure 4A:
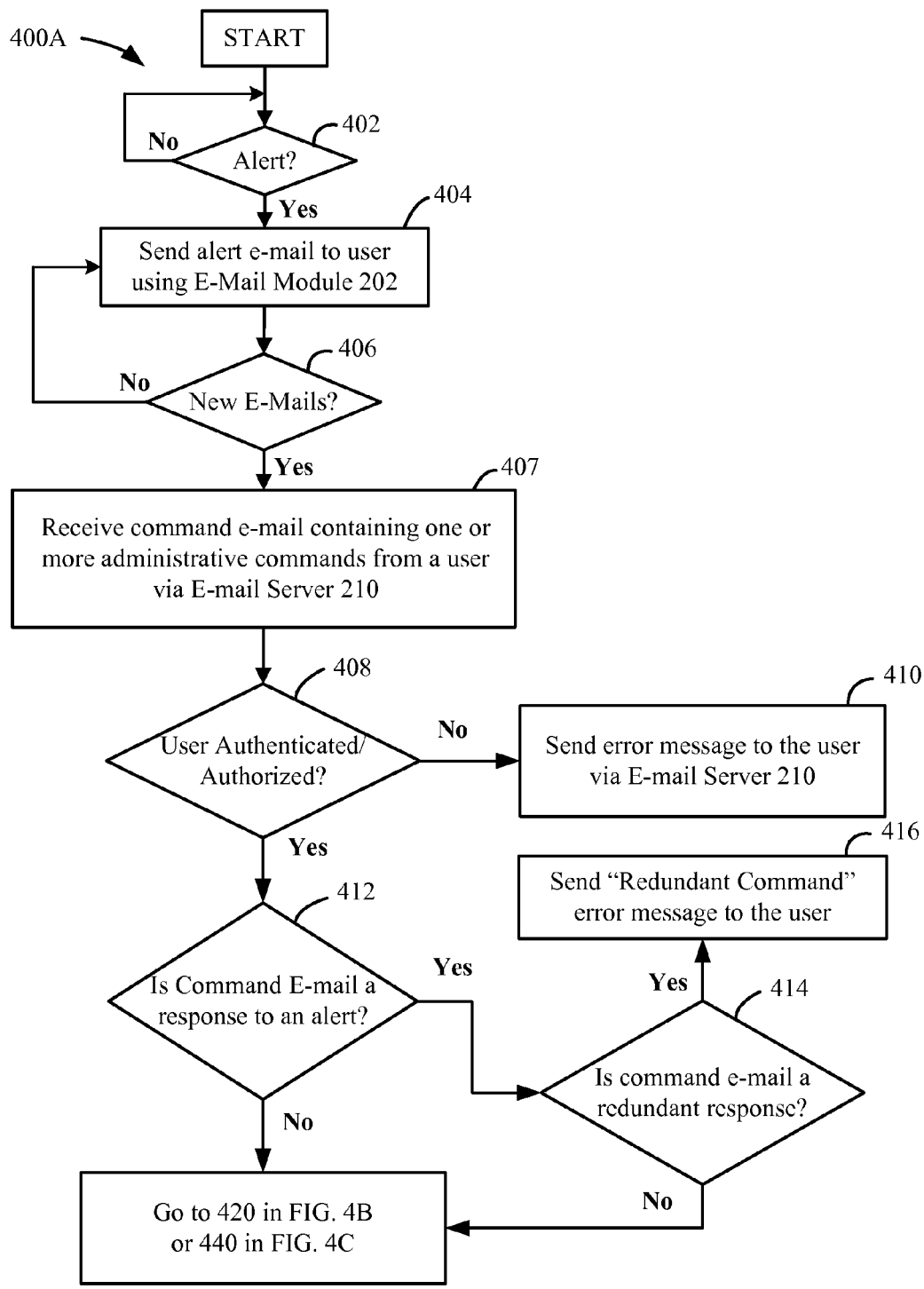
FIGS. 4A and 4B illustrate a method for e-mail based management of a virtualized environment according to an embodiment of the invention.
Figure 4B:
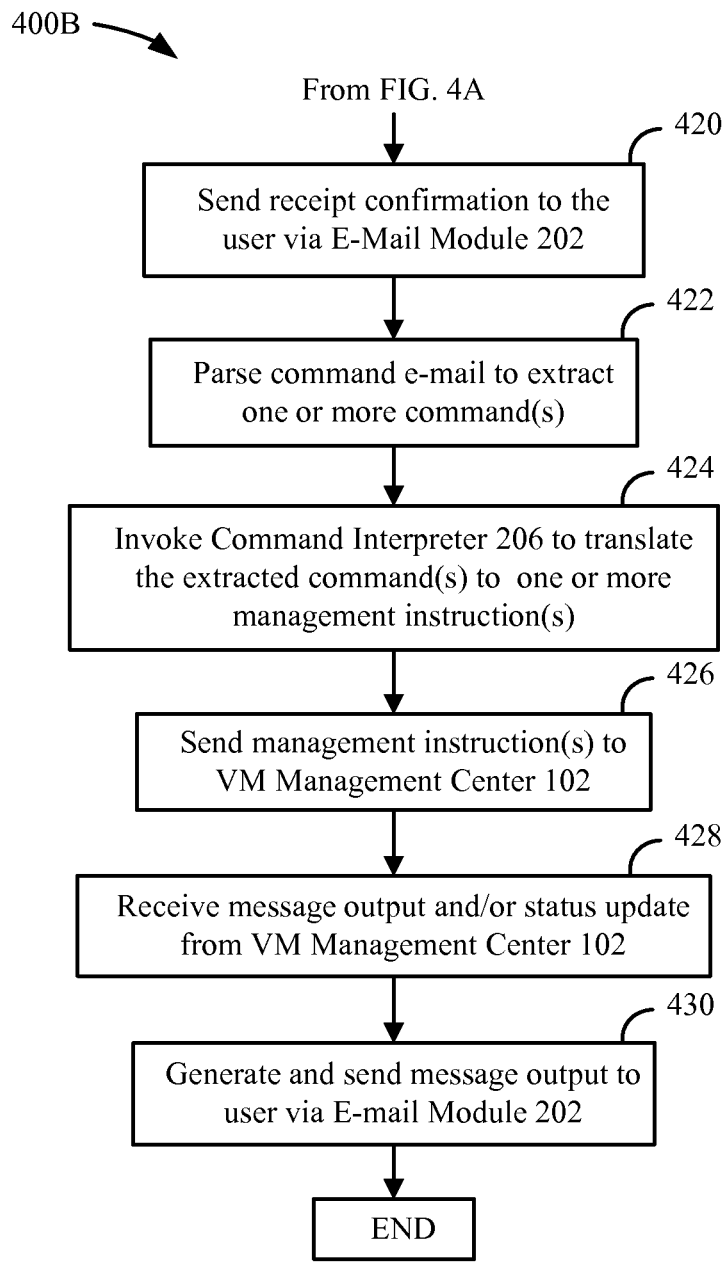
Figure 4C:
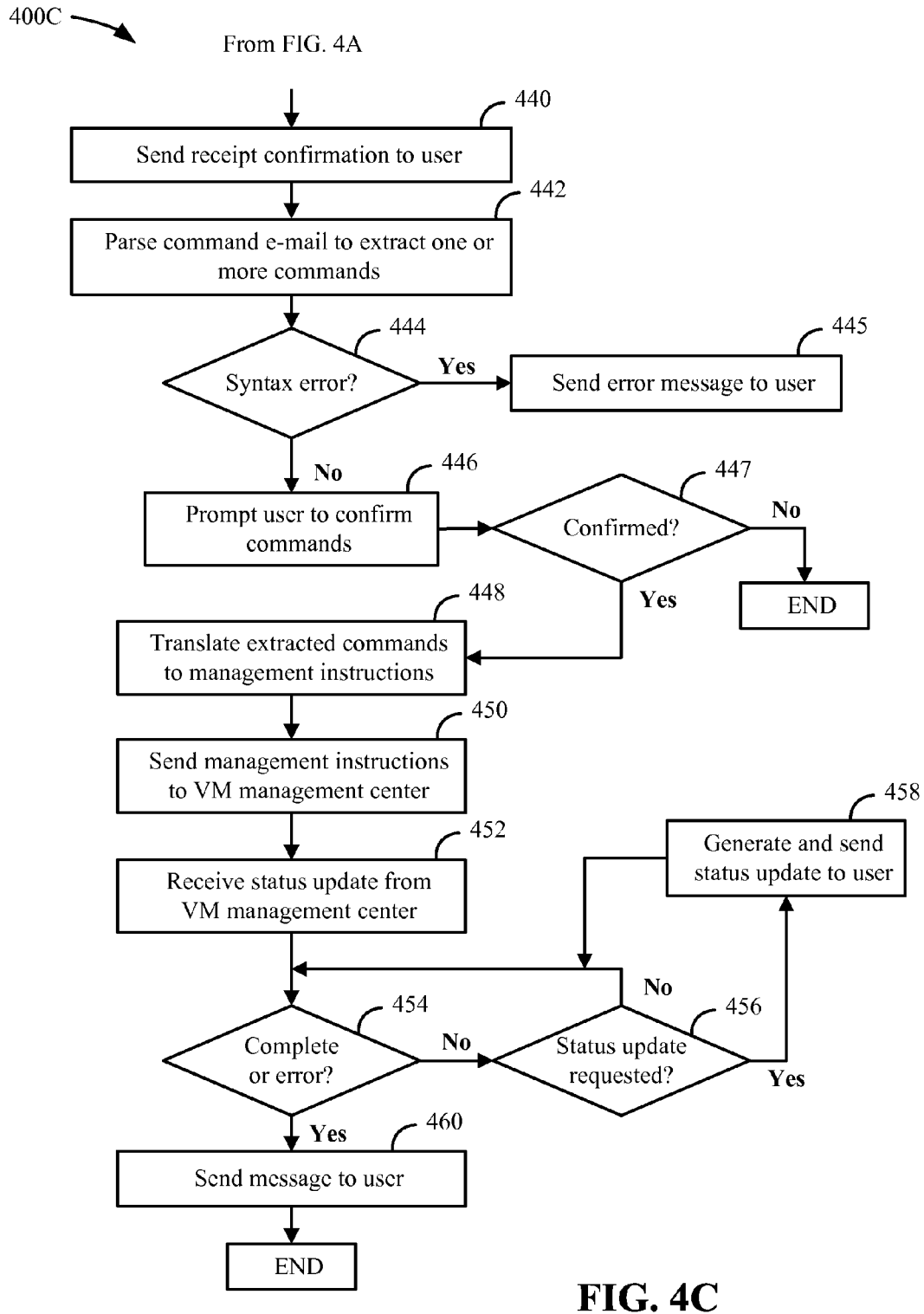

The operations of the administrator command server 120 are depicted in further detail in FIGS. 4A, 4B, and 4C. FIGS. 4A and 4B illustrate exemplary operations 400A and 400B for a method for e-mail based management of a virtualized computing environment according to an embodiment of the invention. FIGS. 4A and 4B illustrate exemplary operations 400A and 400C for a method for e-mail based management of a virtualized computing environment according to another embodiment of the invention.

The operations 400A begin at step 402, where the administrator command server 120 continually checks for any alert condition received from the VM management center 102. If the administrator command server 120 receives a notification from the VM Management Center 102 that an alert condition has been detected for the virtualized computing environment, at step 404, the command controller 204 directs the e-mail module 202 to generate an alert e-mail to one or more system administrators. The operations 400A then proceed to step 406. The command server 120 may wait for a response back from at least one system administrator to which the alert has been communicated. In one embodiment, the command server 120 utilizes a time-out timer wherein if no response to the alert e-mail is received by expiry of the time-out timer, then error handling procedures are invoked, such as resending the alert e-mail. The time-out timer may be cancelled upon receipt of one or more "read receipts" from the system administrator indicating successful delivery of the alert e-mail messages.

At step 406, the e-mail module 202 of the administrator command server 120 connects to the e-mail server 210 to determine whether there are any new e-mail messages addressed to the administrator command e-mail address. If the e-mail module 202 determines that there are no new e-mails to be retrieved, the operations 400A loop back to step 402; otherwise, the operations 400A proceed to step 406.

At step 407, the e-mail module 202 of the command server 120 receives a command e-mail containing one or more administrative commands for managing the virtualized computing environment 100 via the e-mail server 210 and provides the command e-mails to the command controller 204. The command e-mail may be responsive to an alert e-mail, such as the alert e-mail sent during step 404, or may be a new command e-mail unsolicited by the command server 120. The command controller 204 of the command server 120 then proceeds to perform one or more procedures for validating the received command e-mail, according to embodiments of the invention.

At step 408, the command controller 204 performs one or more authentication procedures to verify the identity of the user (i.e., sender) and/or verify the command e-mail has not been tampered with or altered. Responsive to determining the command e-mail is authentic and authorized, the command controller 204 proceeds to step 412, below; otherwise, at step 410, the command server 120 may initiate error handling which includes sending an error message to the user via the e-mail server 210. In one embodiment, the error message is a response e-mail notifying the user of an "unauthorized command," "unauthenticated command," and/or other error reporting details.

Embodiments of the invention provide various techniques that, when used individually or in combination, validate a command e-mail to determine the authenticity of the received command e-mail.

In one embodiment, an authentication approach based on private-key and public-key cryptography, such as digital signatures, may be utilized. Under this approach, the command e-mail is "signed" by a mobile device with a key that only the authorized system administrator may have, such as a private key granted to the system administrator. The command server 120 retrieves a public key corresponding to the system administrator through key distribution techniques known in the art, such as digital certificates. The command server 120 may decrypt the command e-mail using the public key associated with the system administrator to verify that the command e-mail message is authentic (i.e., the e-mail was sent by the claimed sender and unadulterated). In response to determining the command e-mail is authentic, the command server 120 proceeds to step 506 as described above. In one embodiment, the command server 120 may maintain a catalogue of public keys assigned to users authorized to execute commands on the command server.

In an alternative embodiment, an authentication approach based on security tokens may be utilized. System administrators are issued a hardware or software mechanism for generating an authentication code, the mechanism referred to as a "token." For example, the system administrator may have a smart card or a key fob configured to dynamically generate a secret value that is automatically and periodically changed. In another example, the system administrator may visit a separate data source, such as a website, answering one or more security questions known only to the authorized user, and retrieving a token value provided by the website. The system administrator includes the token value in the body of the command e-mail. To authenticate the sender, the command server 120 first retrieves a token value from a security database storing a plurality of synchronous values based on the sender's purported identity (e.g., based on the e-mail address found in the From field). The command server 120 then extracts the token value from the command e-mail and compares the two values. After the command server verifies the presence of a token value in the e-mail body and that the corresponding values match, then the command server 120 may deem the identity of the sender of the command e-mail as being authenticated.

In another embodiment, an authentication approach based on "pass codes" may be utilized. A pass code generally refers to a predetermined value known only to the system administrator. Similar to the token approach discussed above, the command e-mail includes the pass code. In one embodiment, after the command server 120 verifies the presence of the pass code and determines that the pass code corresponds to a value stored in a security database, then the command server 120 may deem the identity of the sender of the command e-mail as being authenticated.

In still another embodiment, an authentication approach based on a trusted communications environment may be utilized. Embodiments of the invention may require a secure connection between the mobile device 220 and the e-mail server 210, such as in VPN connections. In one embodiment, the command server 120 may store a trusted network list comprising a pre-determined list of network addresses, subnet addresses, and other network domains that represent a trusted network environment. The command server 120 may deem a command e-mail authentic if the e-mail appears to have originated from within the trusted network environment, for example, inside a company's intranet. In one embodiment, the command server 120 determines a network address (e.g., IP address) of the sender of the command e-mail by processing one or more e-mail header fields of the command e-mail to determine the IP address (e.g., from the "Received:" field). In another embodiment, the command server 120 may communicate with the e-mail server 210 to obtain sender information.

After authenticating the sender of the command e-mail, the command server 120 determines whether the sender of the command e-mail is authorized to submit and execute the one or more administrative commands contained in the received e-mail for the VM management center 102.

According to one embodiment, a plurality of users may be granted specific roles and permissions for operating the VM management center 102 via the administrator command server 120. By limiting the users, actions, and objects that can be touched by e-mail-based management, as well as limiting the frequency and/or time periods with which commands may be issued, the command server 120 may limit risk of access from an unauthorized channel or user. Such roles and permissions for managing components of the virtualized computing environment may be granted or denied to one or more users and/or groups. For example, one user may be designated as a system administrator for a particular a data cluster, a particular host computer, and/or for a virtual machine executing on one or more host computers. It is appreciated that responsibilities for specific virtualized computer inventory components, such as resource pools, can be delegated based on business organization or ownership. In one embodiment, the roles and permissions may be stored within and managed by the administrator command server 120 or the VM management center 102, or alternatively, may be stored separately, for example, in a lightweight directory access protocol (LDAP) database.

In one embodiment, the command server 120 retrieves the roles and permissions associated with the sender of a command e-mail based on the sender's identity, as specified in the From: field of the e-mail header and/or as authenticated in the preceding step. Based on the retrieved permissions, the command server 120 determines whether the sender has authorization to provide commands to the VM management center 102. For example, the command server 120 may determine whether the sender is a party authorized to execute any administrative commands at all, whether the sender is authorized to execute the particular administrative commands specified in the received e-mail, whether the sender is authorized to execute commands on the one or more particular virtualized components identified in the commands, or some combination thereof. If the commands in the command e-mail are permissible, then command e-mail is deemed authorized, and the operations proceed to step 412.

At some embodiments, rather than entirely allow or disallow a command e-mail based on roles and permission, the command server 120 may determine that the command e-mail from a user requires further approval from a supervisor user. Users may be assigned supervisory-subordinate relationships such that a supervising user may have to review and authorize a command and/or operation submitted by a subordinate user before the administrator command server 120 will process submitted commands. The command server 120 may generate and send an approval request e-mail to a designated supervisor to request approval of the subordinate user's command e-mail. The approval request may contain a description of the commands requested by the subordinate user, a description of the subordinate user's identity, and instructions on how to approve the pending commands. In one embodiment, the instructions may include a hyperlink containing a custom identifier (e.g., hash code) to a web-accessible approval script. In another embodiment, the instructions include text indicating the supervisor user may reply directly to the approval request e-mail with an e-mail that contains a command word indicating approval or denial (e.g., "APPROVE", "DENY") in the body of the e-mail. After the command server 120 receives approval, through one of the embodiments described above, the command server 120 deems the user authorized and proceeds to step 412.

At step 412, the command server 120 determines whether the received command e-mail is a response to an alert. In some cases, multiple system administrators may remotely respond to the same alert e-mail with multiple command e-mails, and due to the asynchronous nature of e-mail communications, the command e-mails may arrive at the command server 120 at varying times. According to one embodiment, the command server 120 validates the received command e-mails to process one of the multiple received command e-mails and to ignore the other command e-mails (i.e., the redundant responses) for the same alert. To determine whether an e-mail is sent as a reply, the command server 120 extracts an alert identifier from the received command e-mail. In one embodiment, the alert identifier may be present in the subject or body of the e-mail, or in a custom metadata field in the e-mail header. If no identifier is found, the received command e-mail is determined to not be a response to an alert and treated as a new command (i.e., unsolicited command), in which case the command server 120 proceeds to step 420 in FIG. 4B or step 440 in FIG. 4C.

If the command e-mail is determined to be a response to an alert (e.g., an alert identifier is found), at step 414, the command server 120 then determines whether the command-e-mail is a redundant response. Generally, the command server 120 applies one or more techniques for resolving response redundancy to select one of multiple command e-mails responsive to the same alert for processing and designate the remainder of the multiple command e-mails as "redundant responses." For example, the command server 120 may apply a "first-in-time" technique whereby a command e-mail first received responsive to an alert is processed while all subsequent command e-mails responsive to the same alert are disregarded. If the command server 120 determines the received command e-mail is a redundant response, then one or more reconciliatory actions are performed. In one embodiment, the command server 120 may ignore the redundant response and, at step 416, send a response e-mail to the user via the e-mail server 210. In one embodiment, the response e-mail may include an error message notifying the user of a "redundant command" and include other error reporting details.

FIG. 4B illustrates additional operations 400B continuing from the operations 400A depicted in FIG. 4A for e-mail based management of a virtualized computing environment according to an embodiment of the invention.

At step 420, the command server 120 generates and sends a receipt confirmation message to the user via the e-mail module 202 to notify the user that the command e-mail has been successfully received. In an alternative embodiment, the command server 120 sends an acknowledgment message at various steps of method 400A. For example, the command server 120 may send an acknowledgment message after step 406 to indicate successful receipt. Alternatively, the command server 120 may send an acknowledgment message, such as a "read receipt," to indicate not only that the command e-mail has been successful delivered, but also opened and processed by the command server 120, such as after step 422.

Subsequent to validating the system administrator's command e-mail, the command server 120, at step 422, parses the command e-mail to extract one or more commands for the VM management center 102. The command server may be configured to disregard quoted text from a previously sent alert message contained in the e-mail body. In one embodiment, the command server detects and strips out the quoted text by searching for quoted line prefixes (e.g., ">") or other conventions of quoted text as is known in the art. In one embodiment, the command server 120 may perform a preliminary syntax check of the contents of the e-mail body. Material in the e-mail body that is not a valid command may be disregarded, flagged, and/or processed separately.

In one embodiment, the command server 120 parses the command e-mail based on a constant numerical or text value, referred to as a "magic number," found in the e-mail. The magic number identifies a file format or protocol by which the e-mail body should be parsed. For example, the magic number may indicate the e-mail body contains scripting logic that should be run by a particular scripting engine prior to execution by the command interpreter.

In one embodiment, the command server 120 places the extracted commands into temporary storage, for example, such as in a queue. Alternatively, the command server 120 immediately executes the extracted commands.

At step 424, the command server 120 invokes the command interpreter 206 to translate the extract commands from a first format to one or more management instructions in a second format executable by the VM management center 102.

At step 426, the command interpreter 206 of the command server 120 connects to the VM management center 102 and transmits the management instructions.

After the instructions have been executed, the VM management center 102 may provide a summary of the actions taken and the post-execution status of the inventory affected by the commands. At step 428, the command interpreter 206 of the command server 120 receives the status results and/or other output resultant from execution of the commands from the VM management center 102.

At step 430, the command server 120 generates a response e-mail, referred herein as a "status e-mail," based on the received status results and/or output. The status e-mail may include a summary of actions taken and corresponding outcomes of the actions. For example, the status e-mails may provide a summary of the commands executed and the post-execution status of the virtualized infrastructure affected by the commands. The command server 120 sends the status e-mail to the sender of the command e-mail corresponding to the executed management instructions via the e-mail module 202.

FIG. 4C illustrates additional operations 400C continuing from the operations 400A depicted in FIG. 4A for e-mail based management of a virtualized computing environment according to another embodiment of the invention.

At step 440, the command server 120 generates and sends a receipt confirmation message to the user via the e-mail module 202 to notify the user that the command e-mail has been successfully received. Then, the command server 120, at step 422, parses the command e-mail to extract one or more commands for the VM management center 102. At step 444, the command server 120 checks for syntax error in the parsed commands. If the parsed commands contain a syntax error, the command server 120 sends an error message to the user at step 445 via the e-mail module 202. If, the parsed commands do not contain any syntax error, the command server 120 sends a prompt to the user at step 446 via the e-mail module 202 to confirm the parsed commands. If the commands server 120 determines at step 447 that the parsed commands are confirmed by the user, step 448 is executed. If, on the other hand, the commands server 120 determines at step 447 that the parsed commands are not confirmed by the user, the method ends.

At step 448, the command server 120 invokes the command interpreter 206 to translate the parsed commands from a first format to one or more management instructions in a second format executable by the VM management center 102. Then, at step 450, the command interpreter 206 of the command server 120 connects to the VM management center 102 and transmits the management instructions.

As the instructions are being executed, the VM management center 102 may provide a summary of the actions taken and the post-execution status of the inventory affected by the commands. At step 452, the command interpreter 206 of the command server 120 receives the status results and/or other output resultant from execution of the instructions from the VM management center 102. A completion notification or an error notification may be returned by the VM management center 102. The command interpreter 206 determines at step 454 whether or not such notification is received. If such notification is received, a completion message or an error message is sent to the user at step 460 via the e-mail module 202 and the method ends. If such notification is not received, the command interpreter periodically checks for execution completion or error. During this time, command interpreter 206 may be prompted by the user for a status update. When the command interpreter 206 is prompted by the user for a status update, as determined by decision block 456, the command interpreter sends a status update to the user at step 458 via the e-mail module 202.

The following is one example of an authorized user performing the interactive task according to the method described above in conjunction with FIGS. 4A and 4C. The user sends an e-mail with the message "Erase Backup" to the administrator command e-mail address. In response, the user receives an acknowledgement that the e-mail was received and is prompted to confirm "Task 1234," which for the purposes of this illustration corresponds to "Erase Backup." If the message "Erase Backup" contained a syntax error, an error message would be returned instead of the prompt to confirm "Task 1234." If the user does not confirm within a predetermined period of time, the task times out at the command server 120. This may occur, for example, if the user was interrupted or lost network connectivity. However, upon user confirmation of "Task 1234" within the predetermined period of time, this task is initiated. When this task completes, a completion message will be returned to the user. If, however, an error is encountered during execution of this task, an error message will be returned instead. In addition, during execution of this task, the user may request a status update. In response to this request, a message such as "Backup deletion: 84%" may be returned to the user.

FIG. 5A is a sequence diagram that illustrates a method for e-mail based management of a virtual environment utilizing a technique to handle response redundancy, according to one embodiment of the present invention. In some cases, when alert messages are sent to several recipients (e.g., system administrators), it may be possible for each of these recipients to issue command e-mails to instruct the command server to take remedial action without each other knowing. The command server, receiving these e-mails arrive as queue, may interpret and execute all the command e-mails, whereas interpreting only one of the command e-mails would be sufficient to address the alert condition. Accordingly, embodiments of the invention may utilize a technique for dealing with such issues of response redundancy.

As shown in FIG. 5A, the command server 120 sends alert messages to several recipients (e.g., system administrators). In the example depicted, an alert message (identified as Alert 1, 2) is received by both mobile devices 220, 230 (identified as "Mobile Device 1" and "Mobile Device 2").

As shown, Mobile Device 1 sends a command e-mail 502 to the command server 120, responsive to the alert message. The command e-mail 502 may be configured a variety of ways to indicate that the command e-mail is responsive to the alert message. As described above, the command e-mail 502 may retain an alert identifier provided by the alert message, for example, in the subject line or in the body of the e-mail, within one or more custom fields in the e-mail headers, or a combination thereof.

At step 504, the command server 120 receives the command e-mail 502 and processes the command e-mail 502 to resolve response redundancy as described herein, as well as to authenticate, extract and interpret the command e-mail, as described above.

In one embodiment, referred herein as a "passive method," command server 120 characterizes received command e-mails as responsive to an alert or as a new unsolicited command. To determine whether a command e-mail is a response to an existing alert, the command server 120 attempts to extract an alert identifier from the e-mail. In one embodiment, this identifier may be present in the subject or in the body of the e-mail, as mentioned above. If no alert identifier is found, the received command e-mail is treated as a new unsolicited command, in which the command server 120 processes and interprets the command e-mail as described above.

If an alert identifier is found, the command server 120 executes the command e-mail if it is the first response received from the system administrators that is responsive to the given alert. In one embodiment, the command server 120 may maintain a record of alerts and corresponding received responses. The command server 120 may update the record each time a first response is received, for example, by setting a flag value corresponding to the alert to a value indicating the alert has been responded to (e.g., TRUE). Accordingly, the command server 120 may check additional responses later received against the record to determine whether to execute the receive commands or discard the message.

For example, as shown, Mobile Device 2 may transmit a command e-mail 508 responsive to the received alert, after some unspecified delay 506. Similar to the command e-mail 502, the command e-mail 508 includes the alert identifier indicating the e-mail is responsive to the particular alert. The command server 120 receives the command e-mail 508 and detects the alert identifier from the e-mail. The command server 120 checks the record and determines that the alert has already been responded to and disregards command e-mail 508. As shown, the command server 120 may send a response message to Mobile Device 230 informing the sender that the alert has already been responded to (i.e., his or her message has been determined to be redundant) and their messages has been subsequently ignored.

Figure 5B:
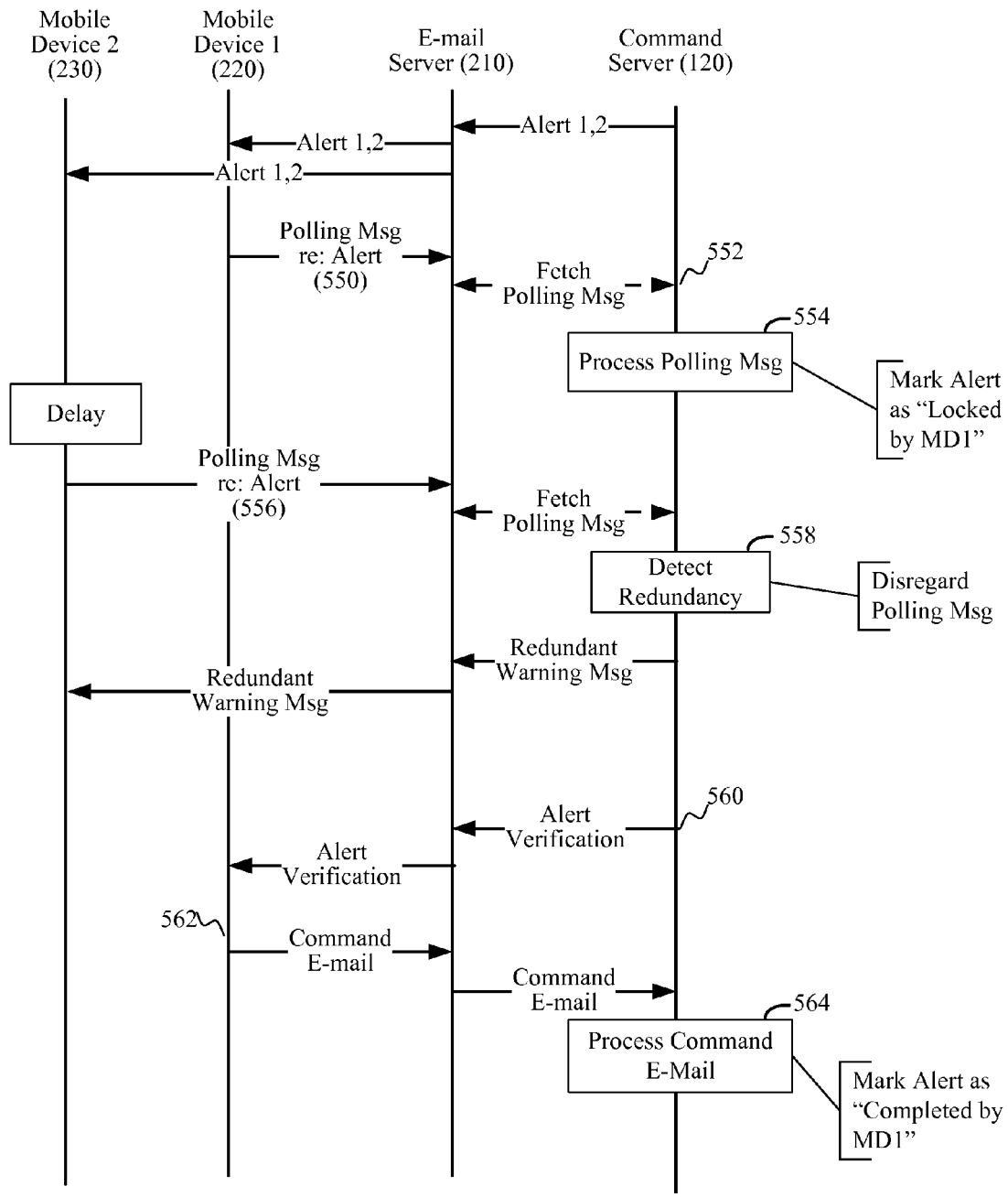

FIG. 5B illustrates an alternative approach for handling response redundancy, referred to as an "active method" for response redundancy control. The operations depicted in FIG. 5B begin similar to the operations seen in FIG. 5A, such as the command server 120 sending alert messages Alert 1 and 2 to several recipients, Mobile Device 1 and 2. However, under the "active method" of response redundancy control, the command server 120 only processes commands from a user that has previously sent a polling message to the command server 120 verifying the continued existence of a condition. The operations of the VM management center 102 and VM data center 104 have been omitted for clarity and are understood to be similar to the operations depicted in FIG. 5A.

This approach generally utilizes two phases to process command e-mails responsive to an alert. In a first phase, at step 550, the Mobile Device 1 sends a polling message to request verification of the continued existence of the alert condition. In one embodiment, the polling message may be an e-mail message having a command that references the alert identifier associated with the alert condition, for example, such as "CHECK 20110819.1547920A." Other command keywords are contemplated, including but not limited to "POLL," "LOCK," "VERIFY," and are predetermined by the command server 120.

At step 552, upon receipt of the polling message, the command server 120 processes the polling message by associating the administrator's identity (e.g., e-mail address) with the alert condition and indicating the alert condition as being "locked." In effect, the command server 120 grants the system administrator sole access to respond to the alert condition, and other command e-mails received for the alert may be disregarded accordingly.

For example, at step 556, Mobile Device 2 sends a polling message to the command server 120 subsequent to the polling message by Mobile Device 1. At step 558, the command server 120 receives the polling message and determines the alert condition has already been locked by Mobile Device 1.

As such, the command server 120 disregards the polling message from Mobile Device 2. The command server 120 may transmit an error message to notify Mobile Device 2 that the polling message sent at step 556 was deemed a redundant response and disregarded. It is understood that the command server 120 would likewise disregard command e-mails, such as the command e-mail 508 in FIG. 5A, from users not having a lock.

In one embodiment, the command server 120 initiates a "lock" timer whereupon expiry of the lock timer, the command server 120 terminates the "lock," disassociates the system administrator's e-mail address from the alert, thereby enabling other system administrators an opportunity to send a polling message to obtain a new response lock. In one embodiment, the command server 120 may take note of previously discarded command e-mails and polling messages and re-transmit an alert message notifying ignored system administrators that the lock has been freed.

In a second phase, as shown at step 560, the command server 120 sends to the system administrator having the "response lock" an alert verification e-mail indicating whether the alert condition still exists, and if so, that the system administrator whether the system administrator is permitted to respond with a command e-mail. At step 562, the system administrator sends a command e-mail instructing the command server 120 to perform one or more remedial action to correct the alert condition. As such, when the command server 120 receives any command e-mails responsive to the alert, at step 564, the command server 120 determines whether the sender of the command e-mail is permitted to execute commands responsive to the alert based on whether a polling message has been received in the first phase from that sender. If so, the command server 120 deems the command e-mail valid and processes as described above. In one embodiment, the command server 120 may update records associated with the alert condition as having been complete or having been addressed by the system administrator.

In an alternative embodiment, not depicted, an approach referred to as a "permissive method" for response redundancy control may be utilized. According to the permissive method, the command server 120 may accept multiple command e-mails responsive to the same alert. The command server 120 then performs a reconciliatory process wherein the commands extracted from the multiple received command e-mails are executed so long as the commands do not conflict. In one embodiment, two or more commands may be characterized as "in conflict" if the commands specify a same component of the virtualized computing environment (e.g., VM, host computer, cluster. etc.) on which to perform one or more management operations on. In another embodiment, two or more commands may be characterized as "in conflict" if the two or more commands specified are incompatible.

For example, the command server 120 may receive a command e-mail including a command to increase a memory provision for VM1 by a factor of two and a command e-mail including a command to migrate VM1 to a different host computer. The command server 120 may permissively execute both commands, resulting in VM1 having a doubled memory provision and then being migrated to a different host computer (while maintaining the increased memory provisioned.) However, in another example, the command server 120 may receive a command e-mail including a command to migrate VM1 from host computer A to host computer B and a command e-mail including a command to migrate VM1 from host computer A to host computer C. As such, the command server 120 determines that the commands are in conflict, and may only execute the command e-mail 502, being received first in time.

Embodiments of the invention advantageously provide a platform-independent command interface for managing a virtualized infrastructure that may be utilized by mobile phones, which are increasingly ubiquitous. Because the administrator is communicating with the command server via e-mail, the need is reduced for an administrator to have a command interpreter running on his/her mobile device or to connect to a server using a VPN in order to perform system management tasks. Finally, as there are no platform requirements for the e-mail client of the mobile device, an administrator may perform management commands using any device that has an e-mail client and is not limited to a particular platform, such as Android-based phones, iOS-based phones, or Windows-based phones.

Embodiments of the invention may be extended to utilize other suitable text-based messaging services besides e-mail. For example, it is contemplated that embodiments of the invention may be utilized with text messaging, such as Short Message Services (SMS) messaging, instant messaging, such as AOL Instant Messenger or Jabber, and mobile-to-mobile messaging, such as BlackBerry Messenger available from Research in Motion (RIM) of Ontario, Canada. Additionally, embodiments of the invention may be extended to include desktop computers, notebook computers, servers, and other suitable computing devices configured for network connectivity, and having a suitable e-mail client for enabling the transmittal and receipt of e-mail messages.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of processing commands for a virtual machine (VM) management module managing a virtualized computing environment comprising a plurality of physical host computers executing one or more VMs, comprising:
   receiving an e-mail message from a sender, the e-mail message comprising one or more commands for provisioning or migrating the virtual machines of the virtualized computing environment in a first format;
   parsing the e-mail message to extract the one or more commands;
   determining whether the e-mail message is a redundant response to a notification issued by the VM management module, wherein the notification indicates a condition associated with the virtualized computing environment has been detected;
   if the e-mail message is a redundant response, then:
   determining whether the extracted commands conflict with one or more commands received by the VM management module in a previous response to the detected condition;
   if the extracted commands do not conflict with the commands received in the previous response, translating the extracted commands from the first format to a second format executable by the VM management module and transmitting the translated commands to the VM management module for execution therein; and
   if the extracted commands conflict with the commands received in the previous response, ignoring the e-mail message; and
   if the e-mail message is not a redundant response, then translating the extracted commands from the first format to the second format and transmitting the translated commands to the VM management module for execution therein.

2. The method of claim 1, further comprising:
   determining a user identity of the sender of the e-mail message; and
   confirming the sender has proper permissions to issue commands to the VM management module.

3. The method of claim 1, further comprising:
   decrypting the e-mail message to verify the e-mail message is authentic.

4. The method of claim 1, further comprising:
   retrieving a security token from the e-mail message; and
   comparing the security token to a token value associated with the sender of the e-mail message to verify the e-mail message is authentic.

5. The method of claim 1, further comprising:
   determining a source network address of the sender of the e-mail message using the e-mail message; and
   determining whether the source network address is located within a trusted network domain.

6. The method of claim 1, further comprising:
   retrieving permissions associated with the sender of the e-mail message; and
   determining whether the sender is authorized to execute the one or more commands extracted from the e-mail message.

7. The method of claim 6, further comprising:
   determining a second user required to approve the one or more commands by the sender;
   sending an approval request to the second user, the approval request comprising an e-mail message having one or more instructions for signaling approval; and
   receiving an approval response from the second user, the approval response comprising an e-mail message having an indication from the second user to approve or deny the one or more commands by the sender.

8. The method of claim 1, further comprising:
   extracting an identifier from the e-mail message, wherein the identifier associates the e-mail message with the detected condition associated with the virtualized computing environment.

9. The method of claim 1, further comprising:
   sending, to the sender, an acknowledgment message comprising a notification of successful receipt of the e-mail message.

10. The method of claim 1, further comprising:
    sending, to the sender, an acknowledgment message comprising a notification indicating the e-mail message is being processed.

11. A non-transitory computer readable storage medium comprising instructions executable by a computer system to carry out a method of processing commands for a virtual machine (VM) management module managing a virtualized computing environment comprising a plurality of physical host computers executing one or more VMs, said method comprising:
    receiving an e-mail message from a sender, the e-mail message comprising one or more commands for provisioning or migrating the virtual machines of the virtualized computing environment in a first format;
parsing the e-mail message to extract the one or more commands;
determining whether the e-mail message is a redundant response to a notification issued by the VM management module, wherein the notification indicates a condition associated with the virtualized computing environment has been detected;
if the e-mail message is a redundant response, then:
  determining whether the extracted commands conflict with one or more commands received by the VM management module in a previous response to the detected condition;
  if the extracted commands do not conflict with the commands received in the previous response, translating the extracted commands from the first format to a second format executable by the VM management module and transmitting the translated commands to the VM management module for execution therein; and
  if the extracted commands conflict with the commands received in the previous response, ignoring the e-mail message; and
  if the e-mail message is not a redundant response, then
translating the extracted commands from the first format to the second format and transmitting the translated commands to the VM management module for execution therein.

12. A method of processing commands for a virtual machine (VM) management module managing a virtualized computing environment comprising a plurality of physical host computers executing one or more VMs, comprising:

receiving an e-mail message from a sender, the e-mail message comprising one or more commands for load balancing resources of the virtualized computing environment in a first format;
parsing the e-mail message to extract the one or more commands;
determining whether the e-mail message is a redundant response to a notification issued by the VM management module, wherein the notification indicates a condition associated with the virtualized computing environment has been detected;
if the e-mail message is a redundant response, then:
  determining whether the extracted commands conflict with one or more commands received by the VM management module in a previous response to the detected condition;
  if the extracted commands do not conflict with the commands received in the previous response, translating the extracted commands from the first format to a second format executable by the VM management module and transmitting the translated commands to the VM management module for execution therein; and
  if the extracted commands conflict with the commands received in the previous response, ignoring the e-mail message; and
  if the e-mail message is not a redundant response, then
translating the extracted commands from the first format to the second format and transmitting the translated commands to the VM management module for execution therein.

* * * * *